United States Patent
Levy et al.

(10) Patent No.: US 11,182,871 B2
(45) Date of Patent: Nov. 23, 2021

(54) SYSTEM AND APPARATUS FOR RIDESHARING

(71) Applicant: ANAGOG LTD., Ramot Meir (IL)

(72) Inventors: Gil Levy, Ramot Meir (IL); Yaron Aizenbud, Haifa (IL)

(73) Assignee: ANAGOG LTD., Tel Aviv (IL)

( * ) Notice: Subject to any disclaimer, the term of this patent is extended or adjusted under 35 U.S.C. 154(b) by 593 days.

(21) Appl. No.: 15/769,052

(22) PCT Filed: Oct. 20, 2016

(86) PCT No.: PCT/IL2016/051140
§ 371 (c)(1),
(2) Date: Apr. 17, 2018

(87) PCT Pub. No.: WO2017/068589
PCT Pub. Date: Apr. 27, 2017

(65) Prior Publication Data
US 2019/0066250 A1 Feb. 28, 2019

Related U.S. Application Data

(60) Provisional application No. 62/246,016, filed on Oct. 24, 2015.

(51) Int. Cl.
*G06Q 50/30* (2012.01)
*G01C 21/34* (2006.01)
(Continued)

(52) U.S. Cl.
CPC ......... *G06Q 50/30* (2013.01); *G01C 21/3438* (2013.01); *G01C 21/3626* (2013.01);
(Continued)

(58) Field of Classification Search
CPC ........... G06Q 50/30; G01C 21/3438; G01C 21/3626; G01C 21/3697; G01C 21/26;
(Continued)

(56) References Cited

U.S. PATENT DOCUMENTS

2014/0114571 A1* 4/2014 Coughlin ........... G01C 21/3438
701/526
2015/0045068 A1* 2/2015 Softer ..................... G01C 21/20
455/456.3
(Continued)

OTHER PUBLICATIONS

Reminder Notifications for the Events on PC wake up, Jan. 5, 2016, Microsoft Community Forum, https://answers.microsoft.com/en-us/windows/forum/all/reminder-notifications-for-the-events-on-pc-wake/6287a071-7330-4ac3-8baa-cf681d5f3bf7 (Year: 2016).*
(Continued)

*Primary Examiner* — Emmett K. Walsh
*Assistant Examiner* — Michelle E Carey
(74) *Attorney, Agent, or Firm* — Lawrence N. Ginsberg

(57) ABSTRACT

A method, computer product and computerized system, the method comprising: obtaining travel information regarding at least one future travel for a user, the travel information comprising at least source, destination and travel start time for the at least one travel; determining a location indication and a mobility status for the user, the mobility status determined at least from acceleration readings taken by a mobile device associated with the user; based on the future travel information, mobility status and location indication, determining that the user is in a pre-stage for the at least one future travel; querying a database for a travel partner matching the user and the future travel; and issuing a suggestion to the user to at least partially share a ride from the source to the destination with the travel partner.

20 Claims, 6 Drawing Sheets

(51) Int. Cl.
    *H04W 4/02*     (2018.01)
    *G01C 21/36*    (2006.01)
    *H04W 4/021*    (2018.01)

(52) U.S. Cl.
    CPC ........ *G01C 21/3697* (2013.01); *H04W 4/027* (2013.01); *H04W 4/021* (2013.01)

(58) Field of Classification Search
    CPC .... H04W 4/027; H04W 4/021; G05D 1/0088; G05D 1/0291; G08G 1/202
    See application file for complete search history.

(56) References Cited

U.S. PATENT DOCUMENTS

| | | | | |
|---|---|---|---|---|
| 2015/0379437 | A1* | 12/2015 | Reich .................... | G06Q 10/02 705/5 |
| 2016/0364678 | A1* | 12/2016 | Cao ........................ | G06Q 50/30 |
| 2017/0126837 | A1* | 5/2017 | Wang ................ | G06Q 10/1095 |

OTHER PUBLICATIONS

International Application No. PCT/IL2016/051140, International Search Report of The International Searching Authority dated Jan. 24, 2017 (2 Pages).

* cited by examiner

SYSTEM AND APPARATUS FOR RIDESHARING

CROSS-REFERENCE TO RELATED APPLICATION

This application claims the benefit of U.S. Provisional Application No. 62/246,016 filed Oct. 24, 2015, entitled "Automation of Ridesharing Matching Process", which is hereby incorporated by reference in its entirety without giving rise to disavowment.

TECHNICAL FIELD

The present disclosure relates to ridesharing in general, and in particular, to automated matching of ride sharing partners, in particular.

BACKGROUND

Ridesharing are becoming more and more popular as they help passengers save money and time, while reducing pollution. Ride sharing may be almost as comfortable as driving one's own car, while enjoying reduced gasoline and maintenance costs, offering company and the option to share long drives.

Analysis of now-available big data shows tremendous amounts of people each driving his or her own car, at the same time from the same source location to the same destination location. Even larger amounts of people drive along a substantially identical route, for example between cities tens or hundreds of miles apart, where their source or destination locations are only a few blocks or streets away from each other. Saving even a small amount of these rides can have great advantages in saving money, effort and pollution.

In another example, two or more people may ride the same public transportation device, such as bus or train, and then need to get to substantially the same area, and each takes a separate taxi. Sharing a taxi or another public transportation may reduce pollution and costs.

Current solutions rely on drivers or passengers searching for travel companions in electronic billboards, social networks, or the like. Such solutions require pro-active searching by drivers seeking passengers to share the costs, or by passengers seeking a ride and willing to share the ride cost.

BRIEF SUMMARY

One exemplary embodiment of the disclosed subject matter is a method performed by a computerized device, the method comprising: obtaining travel information regarding at least one future travel for a user, the travel information comprising at least source, destination and travel start time for the at least one travel; determining a location indication and a mobility status for the user, the mobility status determined at least from acceleration readings taken by a mobile device associated with the user; based on the future travel information, mobility status and location indication, determining that the user is in a pre-stage for the at least one future travel; querying a database for a travel partner matching the user and the future travel; and issuing a suggestion to the user to at least partially share a ride from the source to the destination with the travel partner. Within the method, the travel information is optionally obtained by determining a pattern based upon historic travel information of the user. Within the method, the travel information is optionally obtained from a future event in a calendar of the user or a mail message. Within the method, the mobility status is optionally selected from the group consisting of: walking and riding in a vehicle. Within the method, the suggestion optionally comprises a suggestion to ride as a passenger in a car driven by another user. Within the method, the suggestion optionally comprises a suggestion of having another user as a passenger when the user is driving. Within the method, the suggestion optionally comprises a suggestion to share a ride with at least one other user in a public transportation vehicle. The method may further comprise determining and notifying the user about a required fare. Within the method, the location indication is optionally determined using information associated with a source selected from the group consisting of: Global Positioning System data; a base station of a Wi-Fi network to which the device is connected; and a base station of a cellular network to which the mobile device is connected. Within the method, determining the mobility status and location indication, determining that the user is in a pre-stage for the at least one future travel, querying the database, and issuing a suggestion to the user is optionally performed at a predetermined time frame preceding the future travel. Within the method, the user is optionally in a first leg of a trip, wherein the trip comprises at least a second leg, wherein the future travel is the second leg. Within the method, the first leg of the trip optionally comprises riding in a public transportation to the source, wherein the second leg of the trip comprises traveling from the source to the destination, and wherein the suggestion comprises a ride sharing suggestion with one or more additional users who are designated to reach the source and travel to the destination. Within the method, the travel start time is optionally extracted from a public transportation schedule. Within the method, the one or more additional users are optionally users riding the public transportation and are estimated to be traveling towards the destination.

Another exemplary embodiment of the disclosed subject matter is a computer program product comprising a non-transitory computer readable storage medium retaining program instructions configured to cause a processor to perform actions, which program instructions comprise: obtaining travel information regarding at least one future travel for a user, the travel information comprising at least source, destination and travel start time for the at least one travel; determining a location indication and a mobility status for the user, the mobility status determined at least from acceleration readings taken by a mobile device associated with the user; based on the future travel information, mobility status and location indication, determining that the user is in a pre-stage for the at least one future travel; querying a database for a travel partner matching the user and the future travel; and issuing a suggestion to the user to at least partially share a ride from the source to the destination with the travel partner.

Yet another exemplary embodiment of the disclosed subject matter is a computerized system having a processor, the processor being adapted to perform the steps of: obtaining travel information regarding at least one future travel for a user, the travel information comprising at least source, destination and travel start time for the at least one travel; determining a location indication and a mobility status for the user, the mobility status determined at least from acceleration readings taken by a mobile device associated with the user; based on the future travel information, mobility status and location indication, determining that the user is in a pre-stage for the at least one future travel; querying a database for a travel partner matching the user and the future travel; and issuing a suggestion to the user to at least partially share a ride from the source to the destination with the travel partner. Within the computerized system, the travel information is optionally obtained by determining a pattern based upon historic travel information of the user, or from a future event in a calendar of the user or a mail message. Within the computerized system, the mobility status is optionally selected from the group consisting of: walking and riding in a vehicle. Within the computerized system the suggestion is optionally selected from the group consisting of: a suggestion to ride as a passenger in a car driven by another user; a suggestion comprises of having another user as a passenger when the user is driving; and a suggestion to share a ride with at least one other user in a public transportation vehicle. Within the computerized system, the location indication is optionally determined using information associated with a source selected from the group consisting of: Global Positioning System data; a base station of a Wi-Fi network to which the device is connected; and a base station of a cellular network to which the mobile device is connected.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
FIG. 1 shows a schematic map of an area, over which users can share rides.

One technical problem handled by the disclosed subject matter is the need to provide a platform for suggesting ridesharing by matching and introducing drivers and passengers. In some exemplary embodiments, the ridesharing activity may be sharing a vehicle, such as a private car, a public transportation vehicle, or the like. One form of ridesharing is known as carpooling, which relates to a passenger joining a driver to a ride which the driver intended to take for his or her own purposes. In carpooling, the passenger may share the ride costs and optionally the driving with the driver.

Another technical problem relates to suggesting ridesharing to multiple passengers riding substantially the same route or routes having significant overlap, wherein the passengers may share a ride for at least part of the way. For example, passengers riding the same bus to the same station may want to share a taxi between the location where they disembark the bus and their final or intermediate destination. Similarly, two travelers who arrive from different places to a start location of similar leg of their trips may be wish to be suggested to share a taxi to their shared destination. It will be appreciated that the term taxi relates to any public transportation device in which the price per passenger decreases when the number of passengers increases.

Yet another technical problem is that suggesting to the users to rideshare should be done proactively, without the user having to search for a solution. Moreover, the travel partner matching should be done with minimal or no need of the user to enter data relating the user's route and travel time.

One technical solution relates to an automated service, performed by a server in communication with user mobile devices, such as a mobile phone, Personal Digital Assistant (PDA), a tablet, or the like. The solution may comprise automatically detecting a user's pre-stage which precedes a travel that may be shared, or being on a leg of a travel wherein a subsequent leg is to be shared. For example, a pre-stage may be identified as a person is walking to her car or to a bus station, is leaving a parking space, is preparing to leave the office, is about to get off a bus and proceed to a destination by another transportation means, or the like.

The pre-stage may be identified using data about a user's expected travel. The data may be obtained from analyzing previous travels taken by the user, identifying patterns therein, and predicting future travels based on the patterns. Additionally or alternatively, future travels may be determined from a user's calendar. Further, data about future travels may be manually entered by a user, using for example a dedicated user interface. Pre-stage identification may then be determined using a mobility status of a person such as walking or riding a vehicle, and a location. The mobility status may be obtained, for example, from acceleration data provided by a mobile device carried by the user (which may or may not be augmented using additional sensors of the mobile device), and the location may be obtained from a Global Positioning System (GPS), a base station or a Wi-Fi network or a cellular network to which the user's device is connected, or the like. Pre-stage identification may be performed at a time preceding the expected travel.

Once it is determined that a first user is in a pre-stage for a planned travel or leg thereof, for example about to drive, to take a bus, or to disembark a bus, one or more second users may be identified as potential travel partners. The potential travel partner may be, for example, a passenger who may ride in the vehicle driven by the first user; a driver who may take a first user as a passenger in her vehicle; a traveler disembarking the same bus who can share a taxi with the first user; a traveler disembarking another bus arriving to the same station from which the two users can share a taxi to the same final or intermediate destination, or the like. Thus, when a travel pre-stage is identified for a user, other users who are also in a pre-stage, for example on a leg preceding the leg to be shared, and are going to travel a leg that starts at or passes through the same starting point of the first user may be recognized. Recognition of such users may be performed for example by querying a server.

The resolution of the start and end points may vary, depending for example on driving preferences or on the length of the ride. For example, when the users are going to a city tens or hundreds of miles away from their current location, a difference of a few miles can be tolerated, while in an in-city ride, a maximal difference of a few blocks may be acceptable. Resolution parameter may be selected automatically based on a length of a trip, such as by selecting between different manually defined levels of resolution, by computing resolution using a formula that is based on the length of the trip, or the like.

Calculating common travel segments may utilize a hierarchical arrangement of the locations, such as cities-neighborhoods-streets, highway-highway segments, or the like.

It will be appreciated that in some cases multiple alternative suggestions may be made, for example a user going to his car may be suggested to take a rider, to ride with another driver, or to share a taxi with another passenger. The user may select one or none of the suggestions to be implemented.

The first and second users may then be notified about one another and the option to share a ride.

In some embodiments, a taxi fare for two or more passengers, a suggested cost for a passenger in a carpool, or other helpful data may be calculated and provided.

In some embodiments, a user may configure conditions or preferences, relating for example to the kind of ride sharing the user would like to participate in: whether the user would like to drive, would like to ride in a private vehicle driven by another, would like to share a taxi, or the like; the gender, age, ethnicity, or other demographic characteristic of a travel partner; or other preferences such as interests, or the like. A user may also opt out for one or more travels which he or she prefers to take alone. In some exemplary embodiments, the user may define rules for identifying travels which are not to be shared, such as based on calendar information, based on source or destination, based on time of day, day of month, existence of a holiday, or the like.

The pre-stage recognition and traveler matching may be performed by the user's mobile device, by a server in communication with the device, or a combination thereof. In some exemplary embodiments, the user's mobile device may consume little or no processing power most of the time and wake up only a predetermined time prior to an expected travel, for example every one minute half an hour before expected travel. The service may have an initial stage of studying the person's past travels and predicting future travels. In addition, changes to predicted future travels may be checked and updated anytime the person's calendar changes, and a meeting in a location other than a preceding location is scheduled. Additionally, a user may update the system with additional travels. Additionally or alternatively, expected travels may be determined based on location services, such as triggering a determination when the user's mobile device exits a geo-fence defining her home, office, or other similar location in which the user tends to spend a lot of time in (e.g., periods of over one hour, two hours, three hours, or the like).

In some exemplary embodiments, mobility status determination may be performed using accelerometer reading, with or without augmenting such readings using additional sensors. Based on a mobility status determination, a trigger may be issued to check for potential expected travel, turn on and query the positioning module to determine location of the user, or the like.

One technical effect of the disclosure relates to providing a convenient solution for sharing rides, thus saving on transportation costs and driving effort, reducing pollution and traffic jams and enjoying company.

Another technical effect relates to being notified of the option to share rides, at the time a user needs it and is preparing to go, without having to coordinate or wait for the other person, and without having to specifically indicate where and when such ride is required.

Yet another technical effect is that the ridesharing are suggested without consuming significant processing power or memory from the user's mobile device over prolonged periods of time, and thus do not incur high overhead and drain the battery of the user's device.

Referring now to FIG. 1, showing a schematic map of an area, over which users can share rides, in accordance with some exemplary embodiments of the disclosed subject matter.

The area comprises points, which may be cities, neighborhoods, specific addresses or other points of interest 104, 106, 108, 110, 112, 116, 120, 124 and 128. The thickness of lines connecting any two points indicates the number of travels performed by users in a predetermined time frame, such as an hour, a day, a week, or the like between the two points. For example, it is seen that the largest number of travels is between points 112 and 116, and between points 120 and 124.

Thus, a user going from point 108 to point 120 may ride a bus from 108 to 112, and prior to disembarking the bus at 112 is offered to share a ride with a driver going from 112 to 120. Alternatively, the user may be suggested to share a ride with a driver from 112 to 116. In yet another alternative, the user may be suggested to share a taxi with another passenger on the same bus also going to 116, or with a user riding a bus between 110 and 112 and expected to arrive to 112 at about the same time as the first user.

Similarly, a user going to his car at 120 on his way to drive to 124 may be suggested to take a passenger. In another example, two users about to disembark a bus at 116 on their way to 120 may be suggested to share a taxi from 116 to 120, or the like.

It will be appreciated that any marked segment may represent an aggregation of a multiplicity of routes traveled by users and having nearby start or end points. Thus, point 112 may represent a multiplicity of locations which are close to one another relatively to the distances to other points, similarly for point 116, such that the line connecting 112 and 116 represents all routes traveled between any of the points represented by 112 and any of the points represented by 116.

It will be further appreciated that the shown map may be applicable to a timeframe, such as a quarter of an hour, a half an hour, an hour, or the like. Different segments and different number of travels may be shown for the same area at different times or at different time resolutions. The time resolution may be manually defined by a user, may be automatically selected based on pre-defined rules, automatically computed, or the like. In some exemplary embodiments, the time resolution may depend on the distance of the travel, such as a time resolution for a trip between 104 and 124 may be smaller (e.g., longer timeframe) than resolution for a trip between 124 and 120, which is roughly third the distance of the trip between 104 and 124. Ridesharing suggestions may be provided based on a map for a current time at a relevant time resolution, which may be manually, semi-automatically, or automatically, set.

Figure 2A:
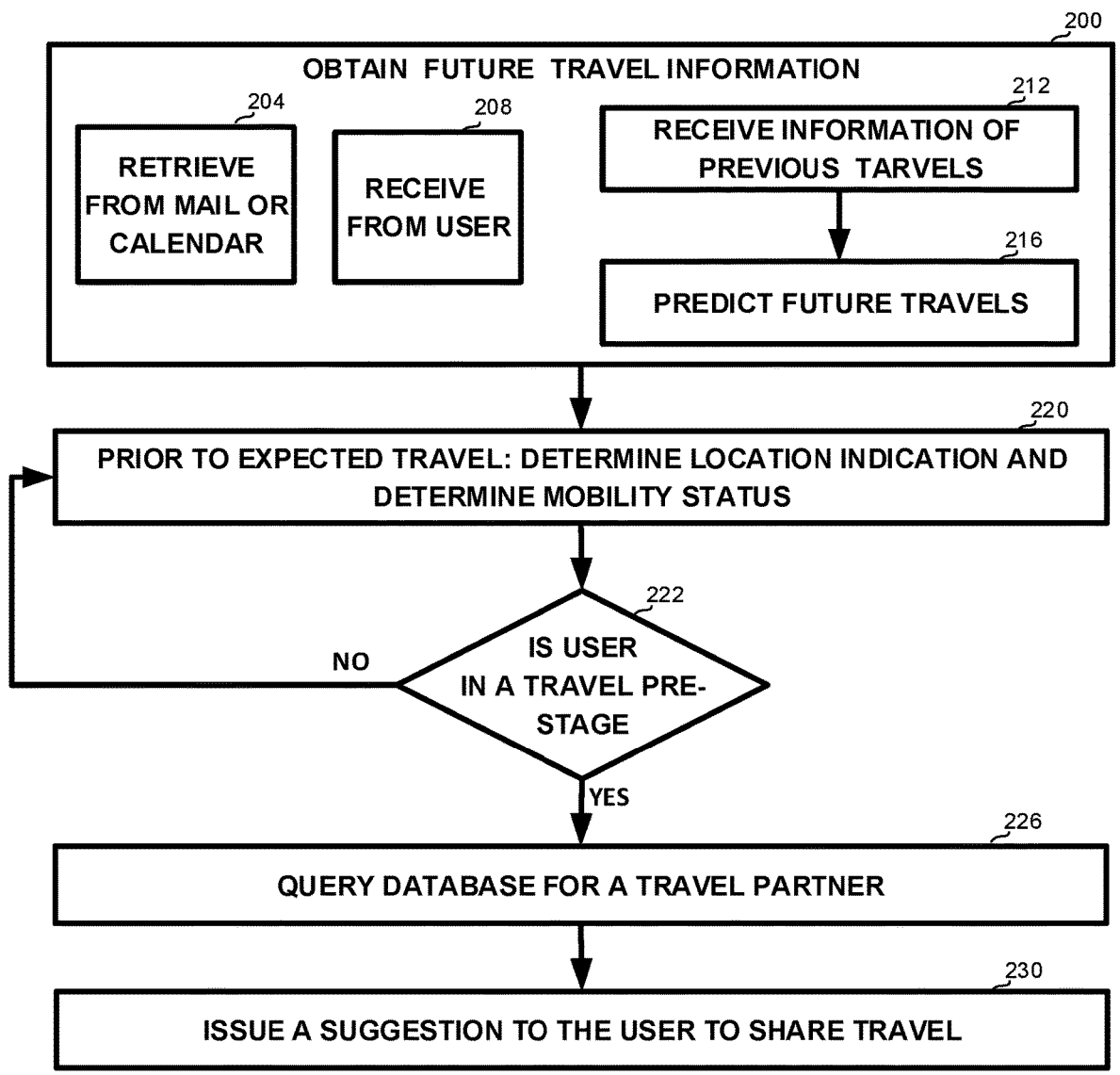
FIG. 2A is a flowchart of a method for suggesting ridesharing to users, in accordance with some exemplary embodiments of the disclosure.

Referring now to FIG. 2A, showing a flowchart of a method for suggesting ridesharing to users, in accordance with some exemplary embodiments of the disclosure.

At step 200, future travel information related to one or more travels may be obtained for each user. The planned travels for multiple users may be stored in a database for early planning. The database, also referred to as a travel database, may be retained on a remote server, such as connectable via the Internet. Alternatively, the information may be stored on the user's mobile device, and provided to a server only when the user is in a travel pre-stage, such that the system may find a travel partner who is also in a pre-stage.

The information may be obtained in one or more of a multiplicity of ways:

For example, at step 204 future travels may be retrieved from a user's calendar, where meeting locations may be indicated. In some cases, a previous location from which the user has to get to the meeting may be deduced from the preceding meeting, or from a default location, such as the user's home or office, depending on the hour and day. In some embodiments, meetings that are indicated as reoccurring may provide further information about their location. Further information may be obtained from mail or other electronically stored messages, containing for example flight tickets, train tickets, invitations, or the like, and optionally from public sources, such as web sites indicating locations (e.g., a location of a conference), etc.

Additionally or alternatively, at step 208, the user may manually enter the details of one or more future travels, including source, destination, date, and estimated departure or arrival time. In some exemplary embodiments, the user may manually verify automatically deduced information. Based on such manual verification, future deductions may be optimized using supervised machine learning techniques, where the verified deductions may be used as the training set and the deductions which were rejected may be used together with the manually provided overriding information.

Additionally or alternatively, at step 212 information may be received or gathered over time, which includes gathering information of past travels of the user, including source, destination, date, time and optionally transportation means. The information may be obtained using mobility status as detailed below, location indications, or any of the options detailed in association with steps 204 and 208 above, such as past meetings.

At step 216, the information about past travels may be analyzed and future travels may be predicted. In some embodiments, patterns of past travels may be realized. For example, it may be identified that a user goes every weekday morning at 8 AM to the office and heads back home at 6 PM; on Monday and Thursday evening the user goes to the fitness club, and every second Sunday goes out of town to a specific location. Information may also be gathered by indicated meeting reoccurrences. Once such patterns are identified, future travels may be predicted as well. In some embodiments, the user may be asked to confirm whether the patterns are correct and whether he would like future travels to be predicted upon them. The patterns may include not only the time, source and destination but also the transportation means, as entered by the user, deduced from other sources, such as electronically purchased travel tickets, Wi-Fi stations installed in trains or busses, or the like.

It will be appreciated that step 200 and the optional substeps may be performed at a preliminary stage, and may also be repeated periodically every predetermined period of time, when changes to the calendar occur, when the user indicated new travels, or the like.

It will also be appreciated that the future travels may be determined for a multiplicity of users and stored in a database, for example on a server.

Determining future travels may be performed on the user's device, on a remote server, or using combination thereof. In some embodiments, the data may be analyzed locally and the results may be retained locally in order to preserve the user's privacy. In other embodiments, the raw data may be retained locally and the determination may be performed locally, while the determined future travels may be transmitted to and stored on a server thus still preserving, although to a lesser degree, the user's privacy. Additionally or alternatively, the raw data may be provided to a server which analyzes the data, determine future travels and stores them. The user may be suggested to select the required mode, in accordance with the user's mobile device resources, privacy policy, preferences, or the like.

At step 220, prior to an expected travel, a location indication and mobility status of the user may be determined at one or more points in time.

In some embodiments, the location and mobility status determination may start at a predetermined time prior to the future travel, for example one hour, thirty minutes, five minutes, or the like, when it is reasonable to assume that the user is preparing for the travel or is in a pre-stage, for example a leg preceding the travel. It will be noted that although a travel time may be estimated, the user may in actuality begin her journey earlier or later than the original expected time.

Additionally or alternatively, mobility determination may be continuous and ongoing, and may be used to detect potential pre-stage of a travel. Once a potential pre-stage of a travel is detected, the details of the forthcoming travel may be obtained. The details may be obtained based on future travel information that was determined in advance (e.g., in step 200). Additionally or alternatively, the details may be determined on the fly, based on the user's travel history, e-mail information, calendar information, and the like. In some exemplary embodiments, a machine learning classifier may be generated based on the information gathered in step 212. The classifier may be trained using the training information to provide a prediction of a travel destination based on various features of the travel. The features of the travel used for prediction may include, for example, current location, current time, time of day, day of week, mobility status, previous location, calendar information, email information, or the like. When a determination of an estimated travel is required, the classifier may be fed with travel features gathered on the fly and a prediction of travel information may be provided. The prediction may include, for example, a predicted travel destination.

In some exemplary embodiments, the location indication may be received from a mobile device associated with the user, such as a smart phone, a tablet, a laptop or the like. The location indication may be determined using a positioning module. The positioning module may utilize a Global Positioning System (GPS) receiver to determine the location. Additionally or alternatively, the positioning module may determine the location based on information received from a base station of a Wi-Fi network the device is communicating with, a cellular station the device is communicating with, or the like. In some exemplary embodiments, the triangulation may be determine exact location. Additionally or alternatively, in absence of sufficient information, a proximate location may be estimated, such as using information from one cellular station. In some exemplary embodiments, the positioning module may be embedded within the mobile device. Additionally or alternatively, the positioning module may implemented on a server or another device external to the mobile device.

The mobility status, being for example walking or riding, may be deduced from one or more acceleration sensors within the mobile device. The pattern of acceleration readings may be indicative of a current mobility status of the user, such as walking, driving, bicycling, riding public transportation, or the like. Determining the mobility status may also utilize the location at a multiplicity of times, and calculating the speed at which the user is moving. In some exemplary embodiments, based on two consecutive mobility statuses, a start or end of a travel leg may be determined. As an example, mobility status changing from walking to driving indicates a beginning of a leg. A mobility status changing from driving to walking indicates an end of a leg. A mobility status changing from riding public transportation to walking to riding public transportation may be indicative of the user ending a first leg and beginning a second leg.

At step 222 it may be determined, upon the location and the mobility status whether the user is in a pre-stage for the future travel. A pre-stage may be, for example, walking to a bus station or to a parking lot, preparing to leave the house or office, or the like. Pre-stage may also refer to being on a leg of the travel, wherein the future travel is a subsequent leg of the travel.

If the user is not in a pre-stage, determining the location and mobility status may continue until the user is in pre-stage, or until a predetermined time after the beginning of the travel has elapsed.

If the user is in travel pre-stage, then the travel database may be updated with the user's and the travel details.

At step 226, the database may be queried for a corresponding one or more travel partners for the user. The query may refer to another user in a pre-stage travel, whose next travel starts at the same point as the user, and whose travel has at least partial overlap with the user's travel, for example his final destination is on the same location as the user's, or on another location arrived at earlier that the user's destination. If multiple other users comply with this condition, those having as much overlap as possible with the user's route may be selected. In addition, the users and the sharing type may have to comply with each other's preferences and settings, related to the transportation means, gender, demographic information, cost preferences, or the like.

On step 230, if a travel partner has been detected, the user and the travel partner may be provided with a suggestion to share the travel, for example in a text message, a message on a dedicated application, or the like. Optionally, either user may be presented with a map indicating the meeting point, for example a bus station, a parking space of the car of one of the users going to the destination, or the like.

The users may also be presented with further information, such as suggested cost to be shared if one of the users is driving, suggested fare when sharing, or the like.

Additionally or alternatively, a taxi ride may be automatically ordered from a taxi provider to a pick up location based on the users accepting the suggestion. The taxi may be instructed to pick up all users at a same location or pick each of them at a different pick up location.

Different examples of options for steps 220, 226 and 230 are provided in association with FIGS. 2B, 2C and 2D below.

Figure 2B:
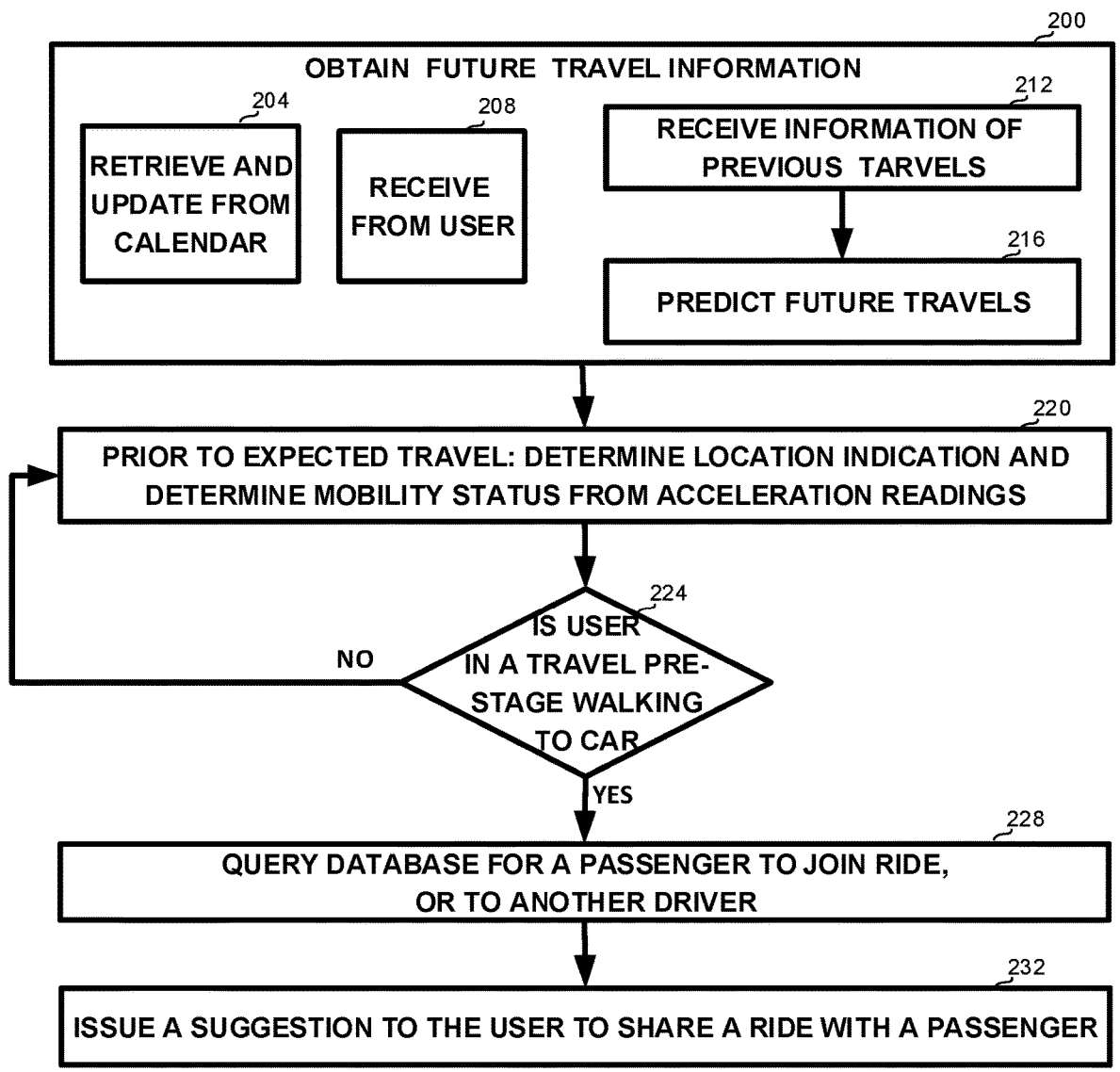
FIGS. 2B, 2C and 2D are flowcharts of methods for suggesting ridesharing to users, in accordance with some exemplary embodiments of the disclosure.

Referring now to FIG. 2B, showing a flowchart of a method for suggesting ridesharing to users, in accordance with the disclosed subject matter.

At step 224 it may be determined whether the user is walking to her car or leaving a parking with the car. Such determination may utilize the mobility status, and the location where the user has left the car, which may be automatically identified and stored (potentially without any user assistance) when the user has parked and switched from driving a car to walking.

If the user is indeed walking to the car or leaving a parking then step 228 may be performed. At step 228 the database may be queried for a person leaving the area without a car and planning to take a bus, or for another driver wherein one of the drivers may leave the car and join the other. It will be appreciated that round-trip considerations may also be taken, for example giving preference to drivers that take a travel of the way back at substantially the same time as the current user. However, this is only optional, as the user not taking her car may later join yet another driver on the way back, while the driver may be matched with another passenger. Additionally or alternatively, a user planning to take a public transportation, a bus, or the like, on the way to the location may be less likely to be affected by a round-trip consideration. The matching process may take into account the round-trip consideration in matching the users.

At step 232, the two users may be suggested to share a ride in the car of the first user. The users may further be presented with expected cost for the passenger, a map of where the car is parked, or the like. Once accepted by both users, a continuous map tracking the location of the car and/or the driver may be presented to facilitate for a speedy pick up.

Figure 2C:
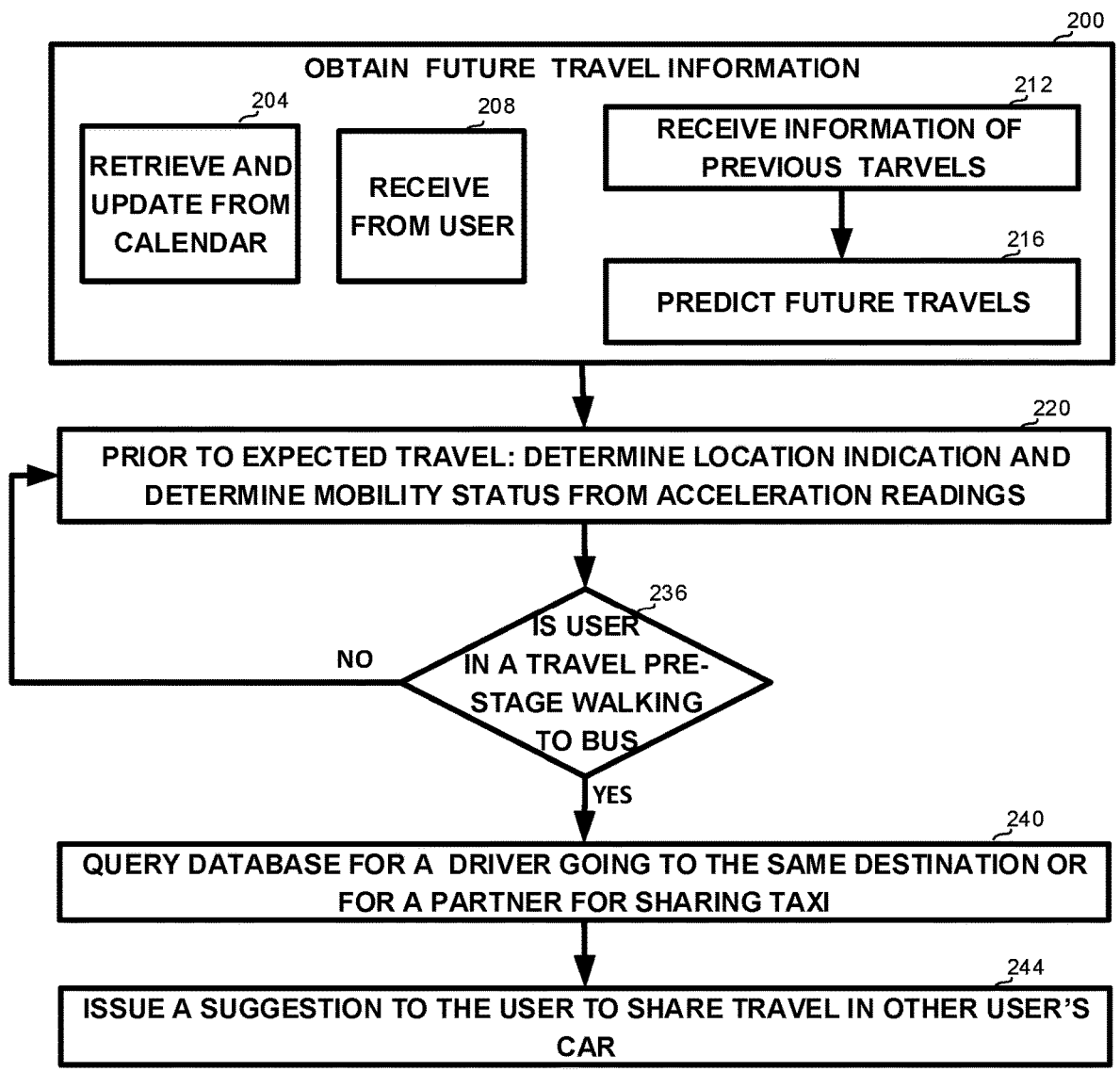

Referring now to FIG. 2C, showing a flowchart of a method for suggesting ridesharing to users, in accordance with the disclosed subject matter.

At step 236 it may be determined whether the user is walking to a bus or another public transportation station. Such determination may utilize the mobility status, the user's path to a known station, knowledge from previous travels that the user arrived from a station, or the like.

If the user is indeed walking to the station, then step 240 may be performed. At step 240, the database may be queried for a user leaving or about to leave the area with a car, or passing on his way at or near the bus station, and going to the same destination as the user. The travel start time may be coordinated by querying an online service for the expected arrival time of the user's bus to the starting point of the leg to be shared, and the estimated arrival time of the driver to the suggested meeting point.

At step 244 the two users may be provided with a suggestion that the first user shares a ride in the other user's car. The users may further be presented with expected cost for the passenger, a map of the meeting point area, or the like.

Figure 2D:
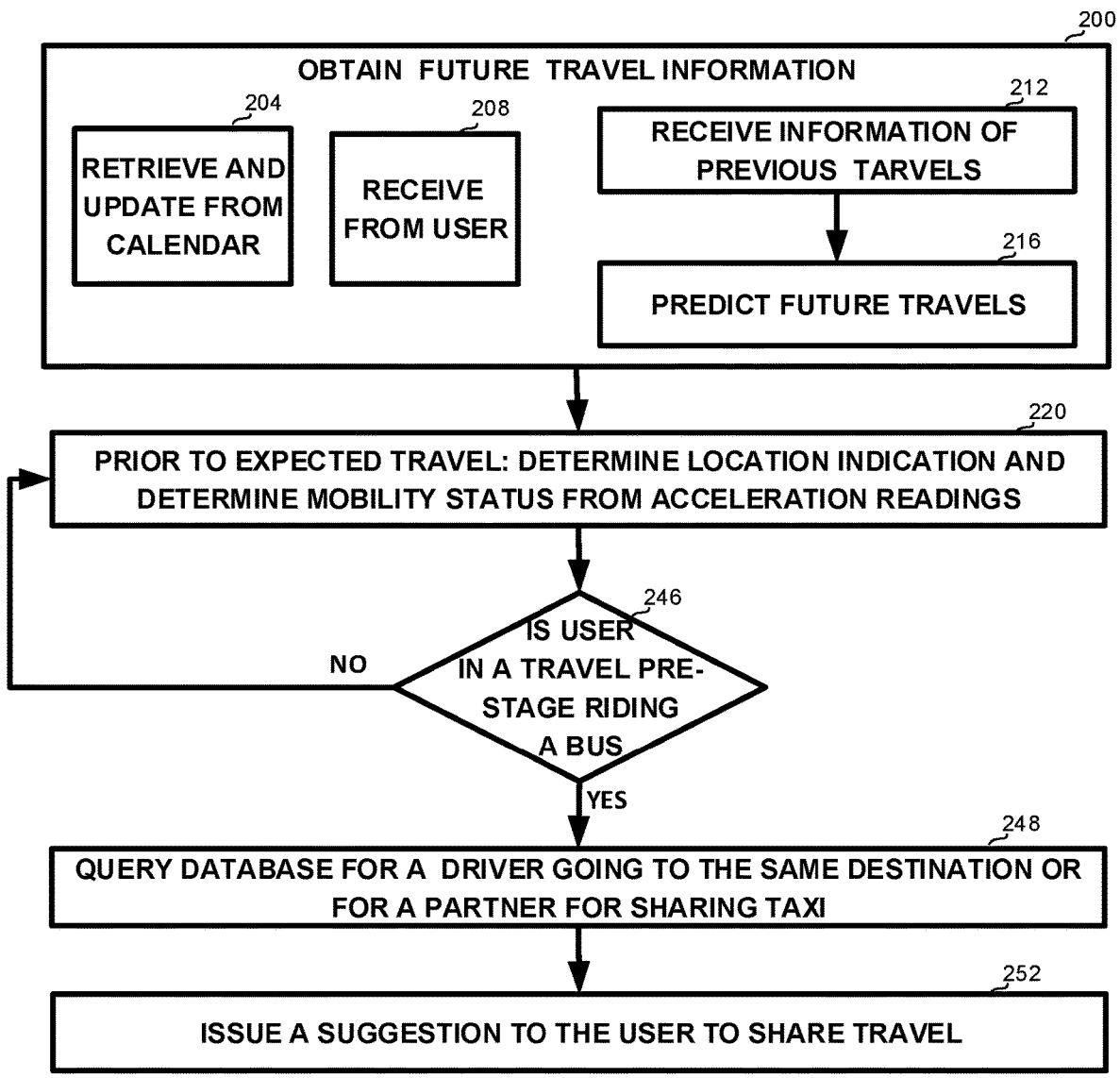

Referring now to FIG. 2D, showing a flowchart of a method for suggesting ridesharing to users, in accordance with the disclosed subject matter.

At step 246 it may be determined whether the user is riding a bus or another public transportation vehicle, to get to a starting point of a next leg of her trip. Such determination may, for example, utilize the mobility status and the user's location as changing over time, which corresponds to the route of the bus that may be extracted from an online service of the bus system, connection to a bus's Wi-Fi station, or the like. Based on the determination, ridesharing suggestion may be provided with respect to the next leg of the trip.

At step 248 database may be queried to identify another user who can share the next leg. The query may be configured to identify another user riding the same bus, or another bus (having the same route or a different one) and going to the same station as the user. Additionally or alternatively, the additional user may be a user reaching the same station or vicinity thereof using a different means of transportation. The additional user may be identified as having a trip or at least portion thereof that overlaps with the next leg of the user (e.g., traveling from the station to a common destination, which may or may not be the final destination of either user). The travel times of the busses may be coordinated, for example, by querying an online service indicating the expected arrival time of each user's bus to the starting point of the leg to be shared. In some exemplary embodiments, a maximal waiting period may be predefined for each user, so that one user may arrive before the second user and wait for her, for a duration that is shorter than the maximal waiting time (e.g., about 15 minutes, about 30 minutes, or the like).

At step 252 the two passengers may be provided with a suggestion to share a taxi or another public transportation means in which the price per person is reduced when more people are traveling together. The users may be provided with estimated taxi cost based on the number of users. In some embodiments, the system may also call a taxi to meet the users at their disembarkment location.

It will be appreciated that determination stage (e.g., 222, 224, 236, 246) may be implemented for all scenarios serially or in parallel, such that for any one or more states that are determined to exist, the corresponding database query step (e.g., 226, 228, 240, 248) and notification step (e.g., 230, 232, 244, 252) are performed. in some exemplary embodiments, the options may be performed in an order prioritized by a user. For example, a user may indicate that she prefers to drive and is willing to take a passenger, another user may indicate that he prefers to share a ride with a driver, while yet another user may indicate preference to sharing a taxi.

It is noted that the above methods are not limited to two users, and a ridesharing suggestion may be issued to any number of multiple users, taking into account limitations such as number of passengers in a vehicle (where applicable), timetable coordination, or the like.

Figure 3:
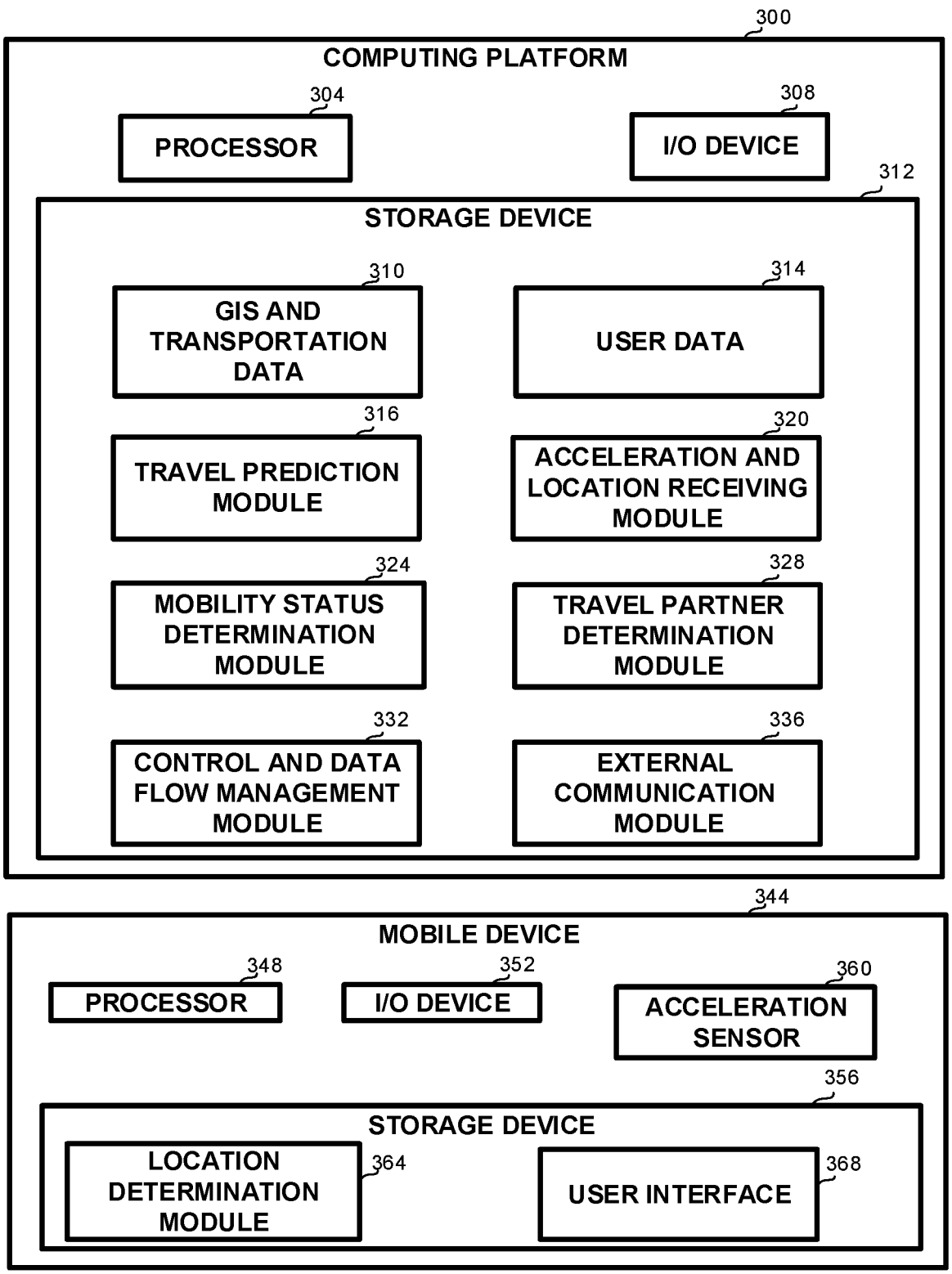
FIG. 3 shows a block diagram of a system for suggesting ridesharing to users, in accordance with some exemplary embodiments of the disclosure.

Referring now to FIG. 3, showing a block diagram of a system for suggesting travel sharing, in accordance with some exemplary embodiments of the disclosed subject matter.

The system comprises one or more computing platforms 300, such as a server located anywhere, and mobile devices 344 each associated with a user, wherein computing platform 300 and each mobile device 344 may be able to communicate with one another using a computerized network. In some exemplary embodiments, mobile device 344 may have Internet connectivity via a cellular network, a Wi-Fi network, or the like. Additionally or alternatively, computing platform 300 may be connected to the Internet using a wired or wireless connection.

Computing platform 300 may collect data from and provide services to a multiplicity of users, each using a mobile device 344.

Computing platform 300 may comprise a processor 304 which may be one or more Central Processing Unit (CPU), a microprocessor, an electronic circuit, an Integrated Circuit (IC) or the like. Processor 304 may be configured to provide the required functionality, for example by loading to memory and activating the modules stored on storage device 312 detailed below.

It will be appreciated that computing platform 300 may be implemented as one or more computing platforms which may be in communication with one another. It will also be appreciated that processor 304 may be implemented as one or more processors, whether located on the same platform or not.

Computing platform 300 may comprise Input/Output (I/O) device 308 such as a display, a pointing device, a keyboard, a touch screen, or the like. I/O device 308 may be utilized to receive input from and provide output to a user such as a system administrator.

Computing platform 300 may comprise a storage device 312, such as a hard disk drive, a Flash disk, a Random Access Memory (RAM), a memory chip, or the like. In some exemplary embodiments, storage device 312 may retain program code operative to cause processor 304 to perform acts associated with any of the modules listed below or steps of the methods of FIG. 2A-2D. The program code may comprise one or more executable modules, such as functions, libraries, standalone programs or the like, adapted to cause a processor to execute instructions.

Storage device 312 may comprise information such as Geographic Information System (GIS) or transportation data 310. One or more maps that include highways, cities, streets, road segments, or the like may be maintained using the GIS or transportation data 310. Additionally or alternatively, GIS or transportation data 310 may be used to compose information regarding bus lines and their planned time tables.

Storage device 312 may comprise user data 314, containing data such as past travels of a user, travels predicted for the user, mobility statuses and locations at particular times, preferences, or the like.

Storage device 312 may comprise travel prediction module 316, for determining future travels, by retrieving times and locations from the user's calendar, receiving information from a user, or analyzing past travels including determining patterns and predicting travels in association with the patterns. In some exemplary embodiments, travel prediction module 316 may utilize a classifier generated using supervised or unsupervised machine learning techniques. The classifier may be invoked to predict a future travel for a user. In some exemplary embodiments, each user may be associated with a different classifier that is generated based on the user's personal data.

Storage device 312 may comprise acceleration and location receiving module 320 for receiving acceleration sensor readings from the user's mobile device, and information relevant for determining the user's location, including GPS readings, identity of base stations, or the like. Additionally or alternatively, instead of or in addition to receiving crude information, processed information such as mobility status derived from the readings may be received.

Storage device 312 may comprise mobility status determination component 324, for determining the mobility status of a user at a point in time, from the acceleration readings and location. In some embodiments, external data such as GIS and transportation data may also be utilized, for example by comparing a sequence of user's locations to a route of a bus. In some embodiments, the readings may be obtained from the user's device. In some exemplary embodiments, mobility status determination component 324 may be implemented in part or in whole on mobile device 344 and processed information may be provided to computing platform 300.

Storage device 312 may comprise travel partner determination module 328, for determining a potential travel partner for a user. Travel partner determination module 328 may be configured to identify a potential partner based on the user's predicted travel. Additionally or alternatively, the identification may be based on the current location of the user. Additionally or alternatively, the identification may be based on the mobility status of the user. Additionally or alternatively, the identification may be invoked when a user is in a travel pre-stage. Additionally or alternatively, the identification may identify other potential travel partners who are also in a pre-stage of a travel having an overlap next leg with the user. In some exemplary embodiments, the identification may be based on the type of mobility status (e.g., walking to a car, walking to a bus, on a bus, or the like). Travel partner determination module 328 may be configured to identify potential travel partners based on the user data 314.

Storage device 312 may comprise control and data flow management module 332 for activating other modules at correct timing, for example a predetermined period of time prior to a predicted travel, providing for each module the required information, or the like.

Storage device 312 may comprise external communication module 336 for communicating with external systems, such as a transportation system for receiving updated information about expected arrival time of busses so that users may be matched in accordance with the time they arrive to the beginning of a travel to be shared; traffic systems providing data about traffic jams; taxi systems for determining taxi availability, ordering a taxi and determining the price in accordance with expected number of passengers, or the like.

Mobile device 344 may comprise processor 348, I/O device 352 and storage device 356 as detailed above for processor 304, I/O device 308 and storage device 312.

Mobile device 344 may comprise one or more acceleration sensors 360, such as an accelerometer. Acceleration sensor 360 may be configured to provide acceleration readings for mobile device 344.

Storage device 356 may comprise location determination module 364 for determining a location of the mobile device 344. Location determination module 364 may utilize on-board sensors, such as a GPS receiver. Additionally or alternatively, Location determination module 364 may obtain a location reading from external location identification service, such as by querying a Wi-Fi location service to determine a location of a Wi-Fi to which mobile device 344 is connected.

Storage device 356 may comprise user interface 368 for suggesting ridesharing to the user, letting the user enter data such as planned travels or preferences, or the like. In some exemplary embodiments, user interface 368 may be configured to allow the user to accept the suggestion and optionally act upon it. Additionally or alternatively, the user may reject a suggestion. Rejected suggestions may be utilized to optimize travel prediction module 316 to reduce likelihood of providing suggestions that the user will reject.

It will be appreciated that in some embodiments, any one or more of travel prediction module 316, acceleration and location receiving module 320, mobility status determination component 324 and location retrieval module 364 may be implemented on computing platform 300 or on mobile device 344 of a user. In further embodiments, their functionality may be distributed between computing platform 300 and mobile device 344.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    obtaining travel information regarding at least one future travel of a user, the travel information comprising at least a source, a destination and a travel start time for the at least one future travel, wherein the at least one future travel is estimated to start by the source at the travel start time, wherein the at least one future travel is estimated to end by the destination, wherein the travel start time comprises a future start time;
    determining a location indication and a mobility status of the user, the mobility status determined at least from acceleration readings taken by a mobile device associated with the user, wherein the mobile device is configured to be in a power saving state, wherein, in order to determine the mobility status, the mobile device is configured wake up from the power saving state a timeframe prior to the travel start time;
    based on the travel information, the mobility status, and the location indication, determining that the user is in a pre-stage of the at least one future travel, wherein said determining that the user is in the pre-stage is performed at a time preceding the travel start time, wherein said determining that the user is in the pre-stage comprises determining that the mobile device exits a geo-fence defining an address associated with the user;
    querying a database for a travel partner matching the at least one future travel, wherein the database comprises future travels of a plurality of users, wherein the future travels comprise the at least one future travel of the user and a second future travel of the travel partner, wherein the second future travel is from the source to the destination, wherein a future start time of the second future travel matches the travel start time of the at least one future travel; and
    issuing a suggestion to the user to at least partially share a ride from the source to the destination with the travel partner.

2. The method of claim 1, wherein the travel information is obtained by determining a pattern based upon historic travel information of the user.

3. The method of claim 1, wherein the travel information is obtained from a future event in a calendar of the user or a mail message.

4. The method of claim 1, wherein the mobility status is selected from the group consisting of: walking and riding in a vehicle.

5. The method of claim 1, wherein the suggestion comprises a suggestion for the user to ride as a passenger in a car driven by the travel partner.

6. The method of claim 1, wherein the suggestion comprises a suggestion of having the travel partner as a passenger when the user is driving.

7. The method of claim 1, wherein the suggestion comprises a suggestion to share a ride with at least one other user in a public transportation vehicle.

8. The method of claim 7 further comprising determining and notifying the user about a required fare.

9. The computer-implemented method of claim 1, wherein the location indication is determined using information associated with a location source selected from the group consisting of: Global Positioning System data; a base station of a Wi-Fi network to which the device is connected; and a base station of a cellular network to which the mobile device is connected.

10. The method of claim 1, wherein: determining the mobility status and the location indication, determining that the user is in the pre-stage for the at least one future travel, querying the database, and issuing the suggestion to the user are performed at a predetermined time period preceding the at least one future travel.

11. The method of claim 1, wherein the suggestion comprises a ride sharing suggestion with one or more additional users comprising the travel partner who are designated to reach the source at the travel start time and travel to the destination.

12. The method of claim 1, wherein the travel start time is extracted from a public transportation schedule.

13. The method of claim 11, wherein the one or more additional users are users riding in a public transportation and are estimated to be traveling towards the source.

14. A computer program product comprising a non-transitory computer readable storage medium retaining program instructions configured to cause a processor to perform actions, which program instructions comprise:
    obtaining travel information regarding at least one future travel of a user, the travel information comprising at least a source, a destination and a travel start time for the at least one future travel, wherein the at least one future travel is estimated to start by the source at the travel start time, wherein the at least one future travel is estimated to end by the destination, wherein the travel start time comprises a future start time;

determining a location indication and a mobility status of the user, the mobility status determined at least from acceleration readings taken by a mobile device associated with the user, wherein the mobile device is configured to be in a power saving state, wherein, in order to determine the mobility status, the mobile device is configured wake up from the power saving state a timeframe prior to the travel start time;

based on the travel information, the mobility status, and the location indication, determining that the user is in a pre-stage of the at least one future travel, wherein said determining that the user is in the pre-stage is performed at a time preceding the travel start time, wherein said determining that the user is in the pre-stage comprises determining that the mobile device exits a geo-fence defining an address associated with the user;

querying a database for a travel partner matching the at least one future travel, wherein the database comprises future travels of a plurality of users, wherein the future travels comprise the at least one future travel of the user and a second future travel of the travel partner, wherein the second future travel is from the source to the destination, wherein a future start time of the second future travel matches the travel start time of the at least one future travel; and issuing a suggestion to the user to at least partially share a ride from the source to the destination with the travel partner.

15. A computerized system having a processor, the processor being adapted to perform the steps of:

obtaining travel information regarding at least one future travel of a user, the travel information comprising at least a source, a destination and a travel start time for the at least one future travel, wherein the at least one future travel is estimated to start by the source at the travel start time, wherein the at least one future travel is estimated to end by the destination, wherein the travel start time comprises a future start time;

determining a location indication and a mobility status of the user, the mobility status determined at least from acceleration readings taken by a mobile device associated with the user, wherein the mobile device is configured to be in a power saving state, wherein, in order to determine the mobility status, the mobile device is configured wake up from the power saving state a timeframe prior to the travel start time;

based on the travel information, the mobility status, and the location indication, determining that the user is in a pre-stage of the at least one future travel, wherein said determining that the user is in the pre-stage is performed at a time preceding the travel start time, wherein said determining that the user is in the pre-stage comprises determining that the mobile device exits a geo-fence defining an address associated with the user;

querying a database for a travel partner matching the at least one future travel, wherein the database comprises future travels of a plurality of users, wherein the future travels comprise the at least one future travel of the user and a second future travel of the travel partner, wherein the second future travel is from the source to the destination, wherein a future start time of the second future travel matches the travel start time of the at least one future travel; and issuing a suggestion to the user to at least partially share a ride from the source to the destination with the travel partner.

16. The computerized system of claim 15, wherein the travel information is obtained by determining a pattern based upon historic travel information of the user, or from a future event in a calendar of the user or a mail message.

17. The computerized system of claim 15, wherein the mobility status is selected from the group consisting of: walking and riding in a vehicle.

18. The computerized system of claim 15, wherein the suggestion is selected from the group consisting of: a suggestion to ride as a passenger in a car driven by the travel partner; a suggestion comprises of having the travel partner as a passenger when the user is driving; and a suggestion to share a ride with the travel partner in a public transportation vehicle.

19. The computerized system of claim 15, wherein the location indication is determined using information associated with a location source selected from the group consisting of: Global Positioning System data; a base station of a Wi-Fi network to which the device is connected; and a base station of a cellular network to which the mobile device is connected.

20. The method of claim 1, wherein the at least one future travel is configured to start at least 5 minutes after said determining that the user is in the pre-stage of the at least one future travel.

* * * * *